(12) United States Patent
Shimoyamada et al.

(10) Patent No.: US 6,702,324 B2
(45) Date of Patent: Mar. 9, 2004

(54) KNEE BOLSTER

(75) Inventors: Tomohiro Shimoyamada, Fujisawa (JP); Shigeki Matsuo, Fujisawa (JP); Yoshiharu Sonoda, Fujisawa (JP)

(73) Assignee: Izusu Motors Limited, Tokyo (JP)

( * ) Notice: Subject to any disclaimer, the term of this patent is extended or adjusted under 35 U.S.C. 154(b) by 0 days.

(21) Appl. No.: 10/133,501

(22) Filed: Apr. 29, 2002

(65) Prior Publication Data
US 2003/0071448 A1 Apr. 17, 2003

(30) Foreign Application Priority Data
May 7, 2001 (JP) ......................................... 2001-135973

(51) Int. Cl.$^7$ ........................................... B60R 21/045
(52) U.S. Cl. ...................................................... 280/752
(58) Field of Search .................................. 280/752, 748, 280/750; 297/488; 296/190.01, 70

(56) References Cited

U.S. PATENT DOCUMENTS 5,518,270 A * 5/1996 Hanada et al. .............. 280/751
5,951,045 A * 9/1999 Almefelt et al. ............. 280/748
6,213,504 B1 * 4/2001 Isano et al. .................. 280/748
6,299,208 B1 * 10/2001 Kasahara et al. ............ 280/752
6,390,503 B2 * 5/2002 Muramatsu et al. ......... 280/750

* cited by examiner

Primary Examiner—Paul N. Dickson
Assistant Examiner—Faye M. Fleming
(74) Attorney, Agent, or Firm—Antonelli, Terry, Stout & Kraus, LLP

(57) ABSTRACT

A knee bolster for absorbing the impact to the knees of the occupant of a car involved in crash and controlling the posture of the occupant by receiving the knee load includes a pair of left and right panels (1) disposed to oppose to the knees, upper stays (2) provided to each of the panels (1), each upper stay having its rear portion fixed to the upper area of the corresponding panel (1), lower stays (3) provided to each of the panels (1), each lower stay having its lower portion fixed to the lower area of the corresponding panel (1) and its upper portion fixed to the front end of the corresponding upper stay (2), and a connecting member (4) for connecting the resulting pair of deltoid bodies. The bodies are disposed side by side and spaced apart when connected to the connecting member (4). Preferably, the upper and lower stays (2, 3) are arced, and the curvature radius of the lower stays (3) is smaller than that of the upper stays (2).

2 Claims, 4 Drawing Sheets

KNEE BOLSTER

FIELD OF THE INVENTION

The present invention relates to a knee protector for a vehicle, hereinafter called a knee bolster, that relieves the impact to the knees of an occupant of a car involved in crash by absorbing the impact energy, and that is capable of securely receiving the load of the knees and thereby of controlling the posture of the occupant.

DESCRIPTION OF THE RELATED ART

A conventional knee bolster is generally composed of two components, including, as depicted in FIG. 6, a panel 10 for receiving and supporting the knees of the occupant when a collision occurs, and a stay 11 that is linearly disposed and that deforms while panel 10 supports the knees so as to absorb the impact energy of the crash. The front portion of the stay 11 is fixed to the instrument panel frame 12, and the rear portion thereof is fixed to the upper area of panel 10. In order to stabilize the characteristics of the stay 11 by reducing the variation in performance based on the differences in the deformation mode caused, for example, by various knee positions of the occupant, a deformation starting point 13, such as a groove or notch, is provided in stay 11 so that deformation always starts from the same position. Further, in order to improve resistance, flange surfaces 14 are often provided to both end rims of the stay 11, as depicted in FIG. 8, so as to increase the section modulus thereof.

In order to effectively absorb impact by the knee bolster, it is necessary to enable the displacement to occur with a fixed deceleration within the range of displacement, or in other words, to maintain a fixed resistance during displacement. However, the stay 11 of the conventional knee bolster does not have an average displacement resistance, and the resistance deteriorates during displacement, so it is difficult to absorb the impact energy with an effective stroke, as can be seen from FIG. 10.

There are many reasons why the conventional knee bolster lacks a fixed displacement resistance against impact energy and thus cannot effectively absorb the impact energy, and the typical reasons are indicated below. The first problem is that stress is concentrated to one portion of the stay 11, thus deforming only that portion, and when that portion bends the resistance of the whole stay 11 is decreased greatly. The deformation starting point 13 becomes the stress concentration point, and the stay 11 is bent at this point 13 as depicted in FIG. 7, and the whole resistance of the stay 11 is deteriorated.

The second problem is that the flange surface 14 is deformed and opened outward by the deformation of the stay 11 caused by concentrated stress, as depicted in FIG. 8, and the section modulus required to maintain resistance is deteriorated locally. By the deformation of the flange, the stay is even more easily bent, thus the whole resistance of the stay is further reduced.

The third problem is that the position of entry of the knees to the panel 10 differs greatly according to the occupant; that is, the knee entry position is high if the occupant is for example a large male, and low if the occupant is a small female. However, the fixture position of the stay 11 is biased toward the upper portion of the panel 10, and if the position of knee entry is low, the lower portion of the panel 10 moves in the upper forward direction, and panel 10 rotates around the rear portion of the stay 11, thus lacking to exhibit resistance, deteriorating the impact absorbing effect of the bolster greatly, as depicted in FIG. 9. If the knee entry position is high, the impact energy received by the panel 10 can be absorbed by the stay 11 being deformed toward the instrument panel frame 12, as depicted in FIG. 7. However, if the knee entry position is low, the stay 11 is often not deformed in the desired manner, and the impact energy cannot be absorbed effectively. When this happens, the panel 10 moves in the forward direction, and the knee bolster cannot perform its function of controlling the posture of the occupant and absorbing the impact energy upon collision.

If due to the various reasons mentioned above the knee bolster is undesirably displaced greatly, it may interfere with the collapsing of the steering column which is intended to reduce the possibility of chest injury to the occupant, and this may lead to serious impact to the human body during the collision.

SUMMARY OF THE INVENTION

The present invention provides a knee bolster that solves the problems of the prior art, having a stay that does not give way due to concentrated stress to one point, that is capable of maintaining resistance constantly, that can absorb the impact energy in an effective manner, that can suppress the amount of displacement, and that effectively absorbs the impact on and controls the posture of the occupant irrespective of the knee entry position of the occupant.

In order to achieve the above objects, the knee bolster according to the present invention for reducing the load received by the knees of the occupant during a collision comprises a pair of left and right panels adapted to be opposed to the knees of the occupant, for receiving the knees upon collision, an upper stay provided to each panel, with the rear portion of the upper stay fixed to the upper area of the panel, and a lower stay provided to each panel, with the lower portion of the lower stay fixed to the lower area of each panel and the upper portion of the lower stay fixed to the front portion of the upper stay, the two substantially deltoid assemblies, each constituted of a panel, an upper stay and a lower stay, are disposed side by side, separated by a predetermined distance, and are connected and fixed to a connecting member. According to another embodiment of the invention, the upper stays and the lower stays of the bolster are arced in opposite directions. Even further, according to the present invention, the radius of curvature of the arced lower stays is smaller than the radius of curvature of the upper stays.

According to the present invention, the knee bolster maintains a constant resistance when displaced within the possible displacement range, and thus can absorb impact energy efficiently. Since the present knee bolster is structured by assembling an upper arced stay and a lower arced stay together as depicted in FIG. 2, upon receiving the load from the knees, the bolster disperses the stress at the arced portion so as not to create a specific stress concentration point to the stays. Thus, the stays are deformed as a whole point as depicted in FIG. 3, instead of being bent at one point, and the impact energy can be absorbed efficiently.

According to the present invention, the knee bolster maintains a fixed resistance constantly without showing any drop in energy absorption during deformation, and thus can absorb a fixed amount of energy constantly, as illustrated in FIG. 11. The deformation resistance of the stay is averaged so as to improve the energy absorption performance.

Moreover, the present knee bolster is capable of providing stable control of the posture of occupants having various builds, corresponding to anyone from a typical grownup male to a small female, as illustrated in FIG. 5. Even if the knee entry position is low, the present knee bolster, having upper and lower stays absorbs the impact energy effectively, and at the sametime the lower stay supports the load securely, reducing the movement of the panel in the forward direction and thereby controlling the posture of the occupant. The knee bolster exerts its function sufficiently even for occupants of small build. By setting the radius of curvature $R_1$ of the arced lower stay to be smaller than the radius of curvature $R_2$ of the arced upper stay, the rear portion of the lower stay curves back toward the front and extends to the lower area of the panel, being fixed to the panel. The rear portion of the lower stay extends to the lower area of the panel, so the present knee bolster is capable of exerting a stable resistance against various positions and directions of knee entry, as depicted in FIG. 5.

As explained above, since the knee bolster is capable of being displaced while maintaining a constant resistance, with the result that the amount of displacement is reduced, the knee bolster rarely interferes with the collapsing mechanism of the steering column. Since it effectively absorbs the impact energy, the present knee bolster provides the same amount of energy absorption with a shorter stroke than the conventional bolster. The remaining space can be utilized as effective space within the instrument panel for disposing other devices.

BRIEF DESCRIPTION OF THE DRAWINGS

FIG. 10 depicts the variation in the displacement resistance with impact load in a prior art knee bolster; and FIG. 11 depicts the variation in the displacement resistance with impact loud in a knee bolster according to the present invention.

DETAILED DESCRIPTION OF THE PREFERRED EMBODIMENT

Figure 1:
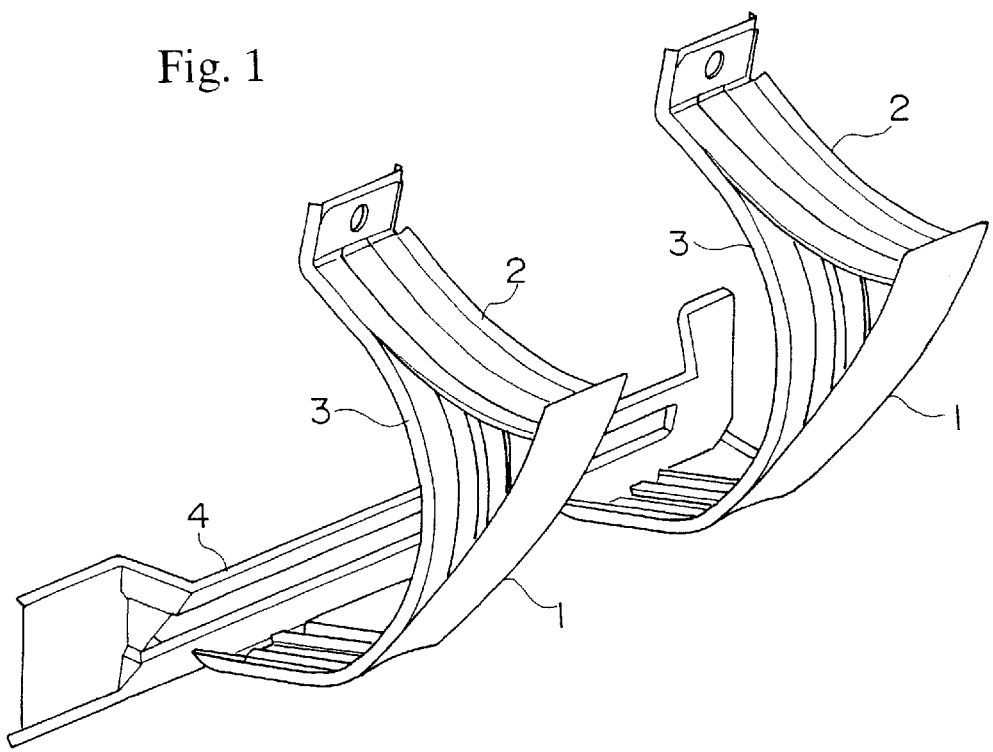
FIG. 1 is a perspective view showing an embodiment of the knee bolster according to the present invention.
Figure 2:
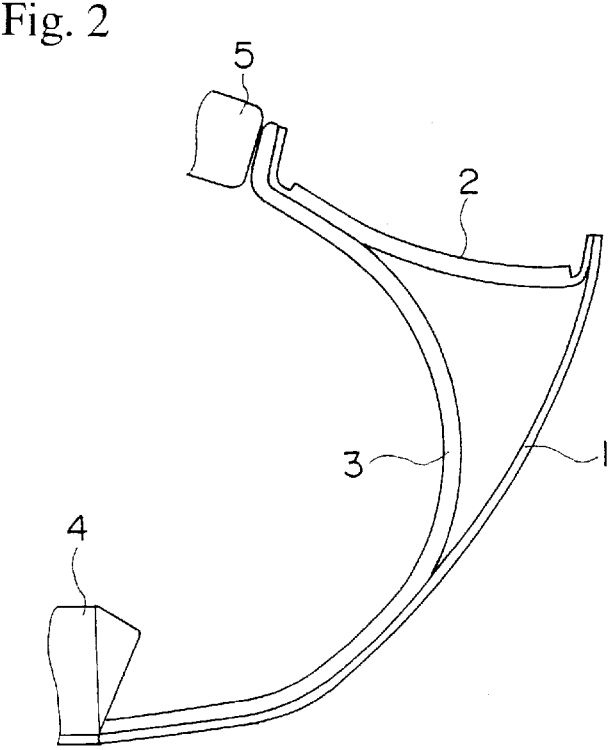
FIG. 2 is a side view showing an embodiment of the knee bolster according to the present invention.
Figure 3:
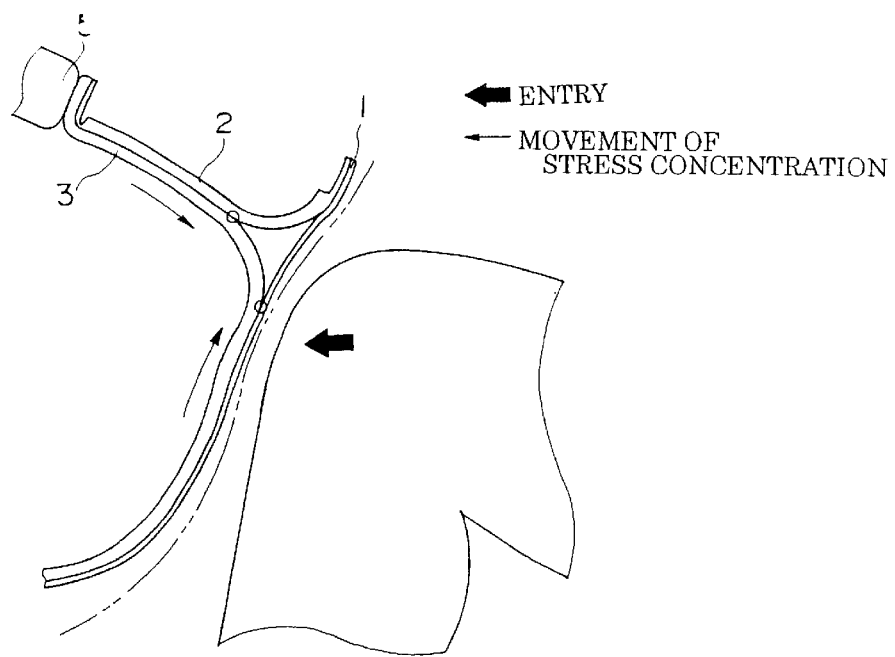
FIG. 3 is an explanatory view showing a deformation example of a knee bolster according to the present invention.
Figure 4:
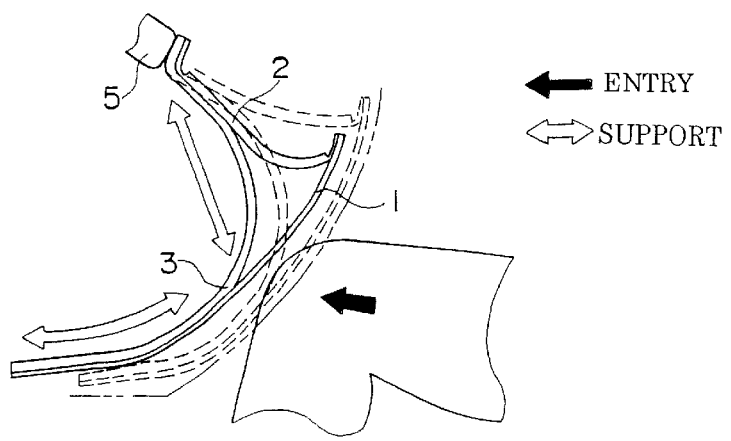
FIG. 4 is an explanatory view showing a deformation example when the entry position is low according to the present knee bolster.
Figure 5:
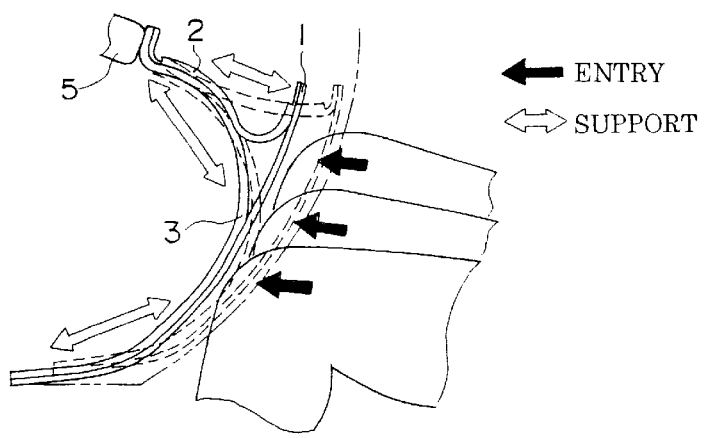
FIG. 5 is an explanatory view showing the corresponding performance with various positions of entry with a knee bolster according to the present invention.
Figure 6:
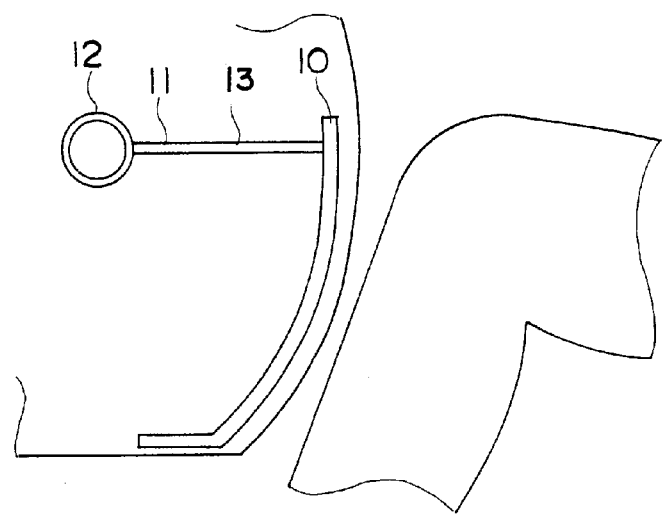
FIG. 6 is a side view showing the knee bolster of the prior art.
Figure 7:
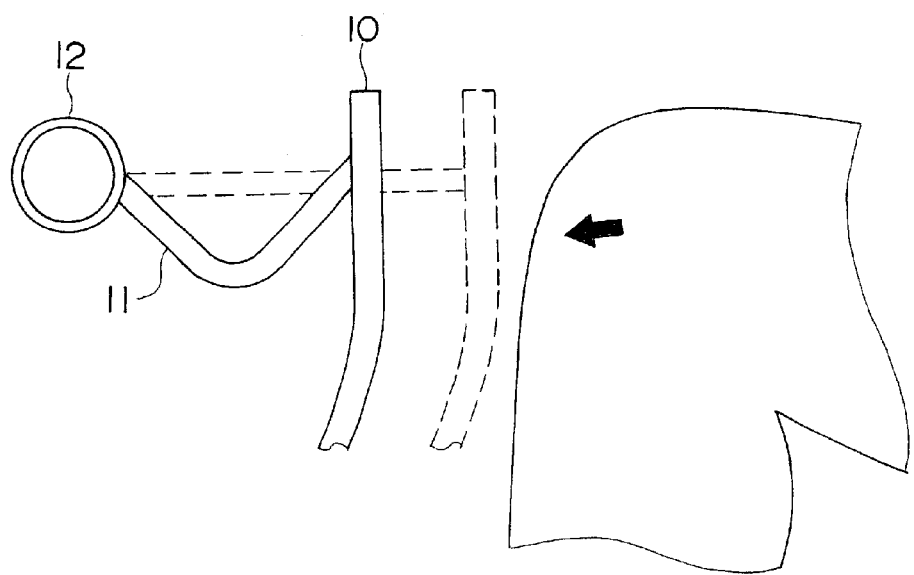
FIG. 7 is an explanatory view showing an example of the deformation of the knee bolster of the prior art.
Figure 8:
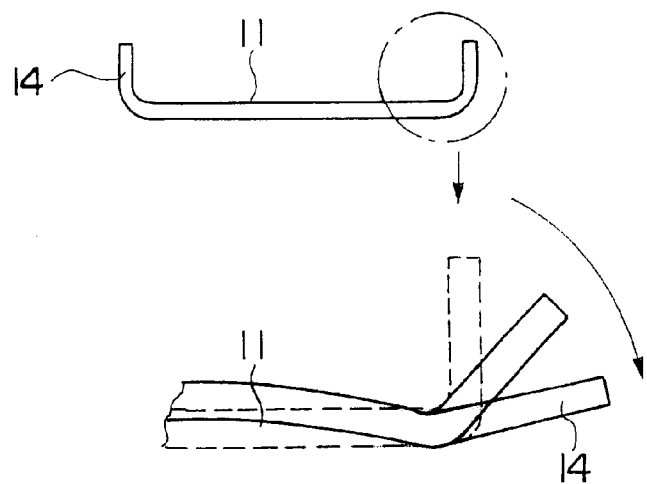
FIG. 8 is an explanatory view showing an example of the deformation of the stay according to the prior art knee bolster.
Figure 9:
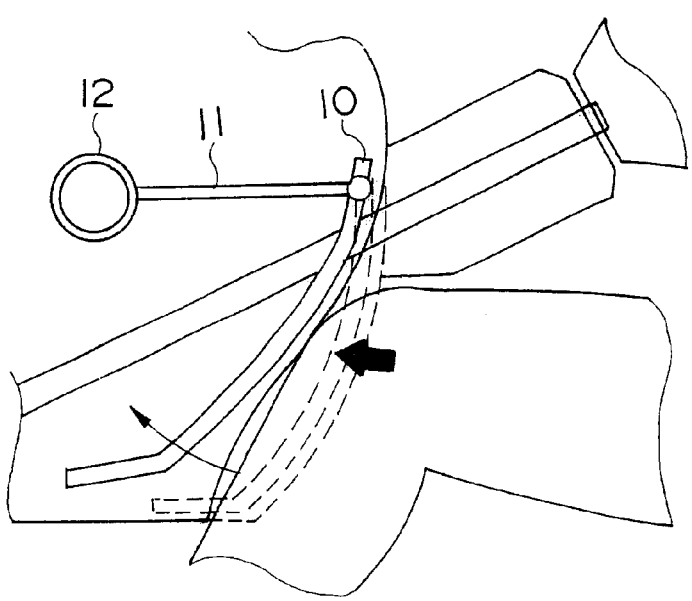
FIG. 9 is an explanatory view showing an example of the deformation when the entry position is low in the prior art knee bolster.

The preferred embodiment of the present invention will now be explained with reference to the accompanying drawings, but the present invention is not limited thereto. In the drawings, reference number 1 denotes the pair of panels (left and right) for receiving the knees of the occupant. The panels are disposed so as to oppose the knees. Reference number 2 denotes an upper stay disposed to each panel 1, with the rear portion of each upper stay fixed to the upper area of the corresponding panel 1. Reference number 3 denotes a lower stay disposed to each panel 1, having the lower portion of each lower stay fixed to the lower area of the corresponding panel and the upper portion of each lower stay fixed to the front end portion of the corresponding upper stay 2. Two resulting substantially deltoid assembly bodies, each constituted of the left or right panel 1, the upper stay 2 and the lower stay 3, are connected and fixed to a connecting member 4 so that they are spaced apart to form a left body and a right body. The upper stays 2 and the lower stays 3 are arced in opposite directions as depicted in FIGS. 1–5, and the curvature radius of the arced lower stay 3 is smaller than the curvature radius of the arced upper stay 2. By setting the curvature radius $R_1$ of the arced lower stay 3 to be smaller than the curvature radius $R_2$ of the arced upper stay 2, the lower end of the lower stay 3 curves back toward the vehicle front direction and reaches the lower end of the panel 1 so as to be fixed thereto.

As explained above, the knee bolster according to the present invention is capable of maintaining a constant resistance while being displaced within the possible range of displacement, thereby effectively absorbing the impact energy caused by a collision. When the knee bolster of the present invention receives knee entry, the bolster disperses the stress at the arced portion so as not to create a specific stress concentration point to the stay, thereby preventing the stay from bending at a single point. When the present knee bolster receives knee entry, the stays deform as a whole, absorbing the impact energy efficiently.

Moreover, the present knee bolster constantly maintains a fixed resistance, and therefore provides a constant energy absorption quantity that does not drop during deformation. Therefore, the present knee bolster provides improved energy absorption performance by averaging the deformation resistance of the stays.

Even further, the present knee bolster is capable of effectively and stably controlling the posture of the occupant irrespective of build, for example from a typical grownup male to a small female. Even when the entry position of the knees is low, the present knee bolster having two stays can absorb the impact energy, and since the panel is securely supported by the lower stay, the forward movement of the panel is reduced and the posture of the occupant is stably controlled. The present knee bolster provides sufficient effect even for small occupants. By setting the curvature radius of the arced lower stay to be smaller than the curvature radius of the arced upper stay, the lower portion of the lower stay curves back around facing the vehicle front and reaches the lower area of the panel so as to be fixed thereto. Since the front end of the lower stay reaches the lower area of the panel, the present knee bolster exerts stable resistance corresponding to various entry positions and directions.

Moreover, as explained above, the present knee bolster can maintain a constant resistance while being displaced, thus minimizing the amount of displacement, and as a result, reducing the possibility of interference with the collapsing mechanism of the steering column. Since the present knee bolster absorbs the impact energy efficiently, the same amount of energy absorption can be ensured with a shorter stroke compared to the prior art knee bolster.

What is claimed is:

1. A knee bolster for reducing the load acting on the knees of an occupant of a vehicle at the time of collision of the vehicle, said knee bolster comprising:

a pair of left and right panels for receiving the knees of the occupant, said panels being disposed so as to be opposed to the position of the knees;

an upper stay provided to each panel, each upper stay having a rear portion fixed to the upper area of the corresponding panel;

a lower stay provided to each panel, each lower stay having a lower portion fixed to the lower area of the corresponding panel and an upper portion fixed to the front portion of the corresponding upper stay, said left and right panels, upper stays, and lower stays forming a pair of substantially deltoid bodies; and a joint member for joining said pair deltoid bodies, deltoid bodies being disposed side by side and spaced apart when fixed to the joint member, wherein said upper stays are arced in a first direction and said lower stays are arced in second direction different from the first direction.

2. A knee bolster according to claim 1, wherein the radius of curvature of the arc of said lower stays is smaller than the radius of curvature of the arc of said upper stays.

* * * * *